UNITED STATES PATENT OFFICE.

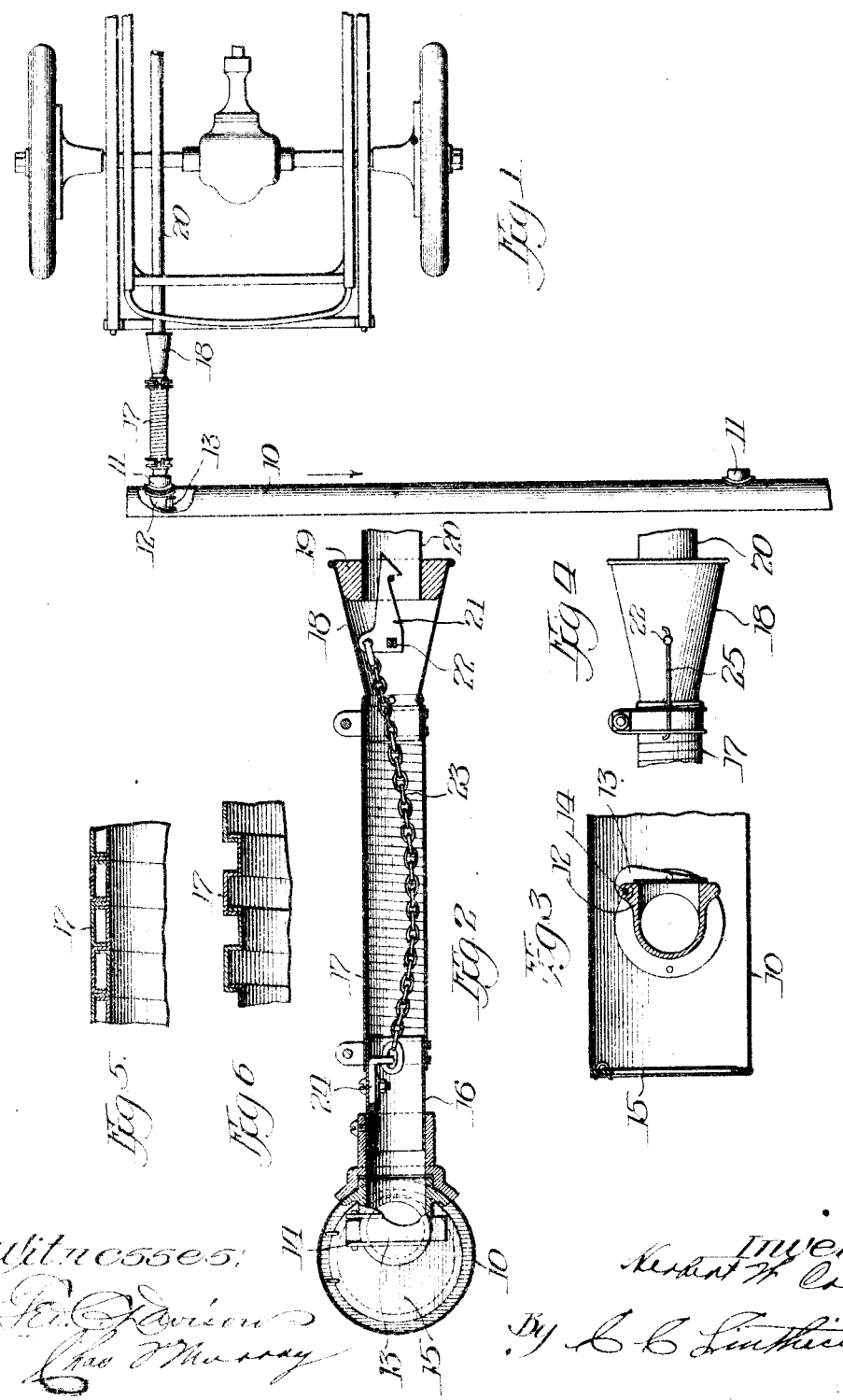

HERBERT W. CRANE, OF CHICAGO, ILLINOIS.

EXHAUST-GAS CONVEYER.

1,112,681.  Specification of Letters Patent.  Patented Oct. 6, 1914.

Application filed May 15, 1914. Serial No. 838,687.

*To all whom it may concern:*

Be it known that I, HERBERT W. CRANE, a citizen of the United States, residing at Chicago, in the county of Cook and State of Illinois, have invented certain new and useful Improvements in Exhaust-Gas Conveyers, of which the following is a specification.

My invention relates to ventilating or waste gas conveying devices and has particular reference to a novel exhaust gas conduit for automobile garages or the like.

It is well known that in garages the engines of the automobiles stored therein are frequently allowed to operate for different purposes with the result that the space rapidly becomes filled with the exhausted and vitiated gases.

My invention has for its principal object the provision of means whereby an automobile after reaching its stall or location within the garage has its exhaust pipe at once connected to the exhaust gas conduit and may thereafter operate as long as desired. This provision permits the engine to be started when preparing to leave the garage, and provision is also made for permitting the automobile to proceed without reference to the connection with the waste gas conduit, the parts being disconnected automatically.

The invention will be more readily understood by reference to the accompanying drawings, wherein—

Figure 1 is a plan view of a portion of the chassis of an automobile, the exhaust pipe of which is connected to one unit of my novel waste gas conveyer; Fig. 2 is a longitudinal section through one of the units referred to; Fig. 3 is a section through the main exhaust conduit showing in detail the one-way valve controlling each inlet; Fig. 4 is a fragmentary plan view of the attaching end of the flexible conductor; Fig. 5 is an enlarged fragmentary section through my novel flexible metallic tube in contracted position; and Fig. 6 is a similar view showing the helices distended.

Referring more particularly to the drawings it will be seen that I provide a comparatively large, longitudinally extending sheet metal conduit 10 having at intervals therein inlets or elbows 11, the inner ends 12 of which, as indicated in Figs. 1 and 3, are curved in the direction indicated by the arrow in Fig. 1, in order that the opening therethrough may present in a line corresponding to the direction of travel of the gases. The mouth of this curved portion is closed by a flap valve 13 hinged at 14 and normally maintained in closed position by gravity. Thus it will be seen that if but one engine is connected to the pipe the exhaust gases therefrom cannot escape through any of the unused inlets 11, the valve 13 maintaining such inlet closed. The extreme end of the conduit 10 is likewise provided with a flap valve 15, as indicated in Figs. 2 and 3, this valve being adapted to swing inwardly. This arrangement is made in order that the passage of gases through the conduit may not be retarded by reason of a reduction of pressure in a dead portion of the conduit. In case of a reduction of pressure at a point behind one of the outlets the valve 15 will permit the entrance of atmospheric air.

Secured to the protruding end of the inlet or elbow 11 is a short tube 16 secured to which is a metallic flexible hose 17. This flexible member is constructed, as best shown in Figs. 5 and 6, by interlocking a plurality of flanged helices, each member of which is in the form of a double, reversed channel the extreme flanged edges of which overlie and underlie the corresponding flanges of adjacent members. The necessity for a metallic hose of this character arises from the fact that the exhaust gases from the engine are very hot. To the outer end of the flexible conductor 17 is secured, by means of a suitable clamp, a frusto-conical metallic member 18 within which a collar 19, secured to the engine exhaust pipe 20, is adapted to enter. The pin, by means of which the collar 19 is secured to the exhaust pipe, extends transversely through the pipe and collar and acts as a fastening device in connection with the hooked rocker 21 pivoted at 22. A chain 23 is connected to the rocker and to a bracket 24 secured to the pipe 16 and tends to rotate the rocker 21 whenever the portion 18 is moved longitudinally with respect to the conduit 10. Thus when the parts are connected if the car should be started the flexible tube 17 would be distended, the chain rocking the part 21 and disconnecting the same from the attaching pin. It will be understood that the collar 19 remains on the end of the car exhaust pipe. A spring 25 connected to the shaft 22 tends to maintain the rocker 21 in the position shown in Fig. 2.

It will be understood that in operation one of the conduits 10 is placed along the wall on each side of the garage. A plurality of the inlets 11 is provided, these inlets being located at a convenient distance apart in order to register with cars which are backed into place. Each of the inlets 11 is provided with a flexible hose and connector and as soon as a car is backed into place the attendant connects the free end of the hose to the car exhaust pipe. The parts remain in this position until the car is again started. It will be understood that an engine is usually operated for a short time prior to the departure of the car and inasmuch as the connecting parts would be very hot it would be inconvenient, if not impossible, to disconnect the same manually. By my arrangement the operator is enabled to depart with the car without further attention to the connection with the exhaust outlet.

It is obvious that the construction shown is only typical of other forms which the invention might assume. I therefore do not wish to be limited to the exact construction herein shown and described.

I claim:

1. In a device of the class described, the combination of a main exhaust conduit, spaced inlets to said conduit said inlets being in the form of elbows, the opening within the conduit presenting in the direction of flow of gases through said conduit, and a flap valve controlling said inlet opening, substantially as described.

2. In a device of the class described, the combination of a main exhaust conduit, spaced inlets to said conduit said inlets being in the form of elbows, the opening within the conduit presenting in the direction of flow of gases through said conduit, and a flap valve hinged to said elbow and gravity actuated whereby the inward movement of the gases is not resisted but escape of gases in a rearward direction is prevented, substantially as described.

3. In a device of the class described, the combination of an exhaust main provided with spaced inlets thereto, a flexible tubular conduit removably connected to said main, said flexible tube terminating in a conical coupling by means of which said tube may be attached to the exhaust pipe of an automobile, substantially as described.

4. In a device of the class described, the combination of a waste gas conduit, a flexible tube removably connected thereto, said tube being provided with a conical coupling, and a hook carried by said conical member and adapted to be actuated upon the extension of said tube, substantially as described.

5. In a device of the class described, the combination of a waste gas conduit having spaced inlets thereto, one-way valves controlling said inlets, a flexible and expansible tube removably connected to said conduit, a coupling carried by said tube, a coupling hook, and means for actuating said coupling hook upon the extension of said tube, substantially as described.

6. In a device of the class described, the combination of an exhaust conduit, a flap valve provided at its rear end, elbows located in spaced relation in said conduit and providing inlets for waste gases, said elbows extending within the conduit and the gases therethrough being directed toward the outlet in said conduit, and valves controlling said inlets, substantially as described.

7. In a device of the class described, the combination of a common waste gas conduit having a plurality of inlets, one-way valves controlling said inlets, flexible tubes connected to said inlets, means for connecting the free ends of said tubes to an exhaust pipe, and automatic means for disengaging the same therefrom, substantially as described.

8. In a device of the class described, the combination of a longitudinally extending exhaust gas conduit having a plurality of inlets thereto, valves controlling the entrance of the waste gases to said conduit, and a one-way valve at the extreme end of said conduit, said one-way valve preventing a reduction of pressure within said conduit at a point to the rear of an inlet, substantially as described.

In testimony whereof I have hereunto signed my name in the presence of two subscribing witnesses.

HERBERT W. CRANE.

Witnesses:
LEWIS T. GREIST,
T. D. BUTLER.